United States Patent
Spijkers et al.

(10) Patent No.: US 6,790,926 B1
(45) Date of Patent: Sep. 14, 2004

(54) WATER VAPOR PERMEABLE THERMOPLASTIC POLYURETHANE FILM

(75) Inventors: Jozef C. W. Spijkers, Haan (DE); Hendricus J. M. Van De Ven, Arnhem (NL); Thomas Mezger, Westervoort (NL); Dirk Bontinck, Evergem (BE); Luc De Koninck, Ukkel (BE)

(73) Assignee: Sympatex Technologies GmbH, Wuppertal (DE)

( * ) Notice: Subject to any disclaimer, the term of this patent is extended or adjusted under 35 U.S.C. 154(b) by 0 days.

(21) Appl. No.: 09/786,906

(22) PCT Filed: Oct. 19, 1999

(86) PCT No.: PCT/EP99/07927
§ 371 (c)(1),
(2), (4) Date: Jun. 20, 2001

(87) PCT Pub. No.: WO00/23492
PCT Pub. Date: Apr. 27, 2000

(30) Foreign Application Priority Data

Oct. 21, 1998 (NL) ............................................ 1010367

(51) Int. Cl.⁷ ......................... C08G 18/32; C08G 18/48
(52) U.S. Cl. ............................... 528/79; 5/499; 36/98; 52/408; 135/87; 297/463.2; 528/904; 602/41; 602/52; 602/58
(58) Field of Search ..................... 528/79, 904; 135/87; 297/463.2; 5/499; 36/98; 52/408; 602/41, 52, 58; 604/304

(56) References Cited

U.S. PATENT DOCUMENTS

| | | | |
|---|---|---|---|
| 3,968,183 A | | 7/1976 | Hayashi et al. .............. 524/505 |
| 4,178,409 A | * | 12/1979 | Tomita ......................... 428/290 |
| 4,192,928 A | * | 3/1980 | Tanaka et al. ............... 521/177 |
| 4,990,545 A | * | 2/1991 | Hourai et al. ................ 521/171 |
| 5,049,638 A | * | 9/1991 | Matsumoto et al. .......... 528/61 |

FOREIGN PATENT DOCUMENTS

| | | |
|---|---|---|
| DE | 0 714 950 A2 | 6/1996 |
| EP | 0 358 406 A2 | 3/1990 |
| JP | A 55-54320 | 4/1980 |
| JP | A 1-174572 | 7/1989 |
| JP | A 4-45117 | 2/1992 |
| JP | A 9-157409 | 6/1997 |
| WO | WO 96/06875 | 3/1996 |

OTHER PUBLICATIONS

Kirk–Othmer, *Enclyclopedia of Chemical Technology*, vol. 9, 1966, pp. 232–241.

* cited by examiner

*Primary Examiner*—Rabon Sergent
(74) *Attorney, Agent, or Firm*—Oliff & Berridge, PLC

(57) ABSTRACT

Claimed is a non-porous, waterproof film having a water vapor permeability of at least 1000 g/m² day, based on a thermoplastic polyurethane, wherein the polyurethane is composed of a) 40 to 52 wt. % of polyether glycol having an atomic ratio of carbon to oxygen in the range of 2,0 to 4,3, with at least 30 wt. % of the polyurethane being composed of a polyether glycol having an atomic ratio of carbon to oxygen in the range of 2,0 to 2,4, b) 30 to 45 wt. % of polyisocyanate, calculated as 4,4'-diphenyl methane diisocyanate, c) 0,5 to 10 wt. % of araliphatic diol, and d) 5 to 20 wt. % of low-molecular weight chain extender, calculated as 1,4-butane diol, less the amount of araliphatic diol.

Also claimed is the use of these films in rainwear, shoes, tents, seats, as mattress covers, as understating, in garments for medical purposes, and for the manufacture thereof of wound dressings.

16 Claims, No Drawings

WATER VAPOR PERMEABLE THERMOPLASTIC POLYURETHANE FILM

The invention pertains to a non-porous, waterproof film having a water vapour permeability of at least 1000 g/m² day in accordance with ASTM E96-66 (Procedure B), with the proviso that the water temperature is kept at 30° C., while the ambient temperature is 21° C. at 60% RH, based on a thermoplastic polyurethane composed of a polyether glycol, a polyisocyanate, and a chain extender, at a ratio of NCO to active hydrogen atom of 0,9 to 1,2, and to the use of such films in rainwear and tents, as mattress covers, as underslating for roofing, in the manufacture of waterproof shoes, in the manufacture of seats, especially car seats, in garments for medical purposes, and for the manufacture thereof of wound dressings.

Non-porous, waterproof and water vapour permeable films based on a thermoplastic polyether urethane of the aforesaid composition having a water vapour permeability of at least 1000 g/m² day are known from JP-A-09 157 409. The preparation of the polyurethane resin does not involve the use of solvents. Because of the presence of a very high percentage of polyethylene oxide glycol, a polymer is obtained which in its film form has a very high water vapour permeability, but which also has high tackiness. Furthermore, it was found that the waterproofness of films of the composition as described in said document is found wanting for a wide range of applications. Likewise, polyurethanes of the composition as described therein generally have a too low melting point for use in many of the applications listed above.

The invention now provides non-porous thermoplastic polyurethane films having a high water vapour permeability, a satisfactory waterproofness, and a sufficiently high softening point to allow cleaning at higher temperatures in the case of use in, e.g, garments.

The invention consists in that in a thermoplastic polyurethane film of the known type mentioned in the opening paragraph the polyurethane is composed of:

a) 40 to 52 wt. % of polyether glycol, calculated as polyethylene oxide glycol, having an average molecular weight of greater than 800 to 4000 and an atomic ratio of carbon to oxygen in the range of 2,0 to 4,3, with at least 30 wt % of the polyurethane being composed of a polyether glycol having an atomic ratio of carbon to oxygen in the range of 2,0 to 2,4, b) 30 to 45 wt. % of polyisocyanate, calculated as 4,4'-diphenyl methane diisocyanate, c) 0,5 to 10 wt. % of araliphatic diol of the formula

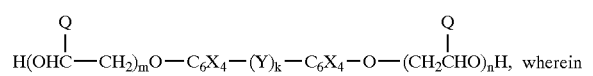, wherein k=0 or 1, where if k=1, Y stands for a methylene or isopropylidene group, Q has the meaning of an H-atom or a $CH_3$ group, $C_6X_4$ has the meaning of a phenylene group wherein X is hydrogen or a chlorine or bromine atom, and m and n may be the same or different and stand for an integer $\geq 1$, with $m+n \leq 10$, and d) 5 to 20 wt. % of a chain extender having a maximum molecular weight of 500, calculated as 1,4-butane diol, less the amount of araliphatic diol.

Surprisingly, it was found that polyurethane films of the aforesaid composition are well-balanced in terms of softening point, water vapour permeability, waterproofness, and sticking. Moreover, using a halogenated araliphatic diol makes it possible to obtain films which have fire retardant properties. It should be noted that thermoplastic polyurethanes which have a higher softening point because of the incorporation of a compound based on an ethoxylated and/or propoxylated bisphenol A are known as such from Japanese patent publications JP-A-55-54320 and JP-A445117.

The former publication discloses a polyurethane incorporating a compound of the formula

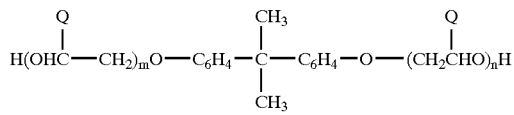

For the meaning of n and m an integer of 2 to 30 is listed there, while Q stands for a $CH_3$ group or a hydrogen atom and $C_6H_4$ stands for a phenylene group. The examples only mention diols with an average molecular weight of 1800 to 2000. The compounds do not have the effect of increasing the softening point, however, but only have a favourable effect on such general physical properties as resistance to degradation under the influence of UV light, yellowing, and sticking. Nor is there any mention of the possible use of polyethylene oxide glycol for the manufacture of water vapour permeable films.

In the latter publication there also is a polyurethane incorporating a diol according to the formula above. The object in this case is to obtain a less brittle polymer which gives fewer injection moulding problems. In order to obtain a sufficiently hard polymer, the molecular weight of any polyalkylene oxide glycol incorporated therein should not exceed 800. Consequently, there is no question of the manufacture of films, let alone waterproof yet at the same time water vapour permeable films.

Preferably, the long-chain glycols are composed wholly of polyethylene oxide glycol. In some cases it may be desirable to employ random or block copolymers of epoxyethane with minor amounts of a second epoxyalkane. In general, the second monomer makes up less than 40 mole % of the polyalkylene oxide glycols, preferably less than 20 mole %. Suitable examples of second monomers are 1,2- and 1,3-epoxypropane, 1,2-epoxybutane, and tetrahydrofuran. Alternatively, use may be made of mixtures of polyethylene oxide glycol, e.g., poly-1,2-propylene oxide glycol or polytetramethylene oxide glycol.

Using a polyalkylene oxide glycol with a molecular weight of 800 or less will generally be at the expense of the water vapour permeability, and also less flexible films are obtained. Using a polyalkylene oxide glycol with a molecular weight of more than 4000 may give rise to problems due to phase separation.

So far, very favourable results have been obtained using a polyalkylene oxide glycol with an average molecular weight of 1000 to 3000.

Optimum results have been obtained so far using a polyalkylene oxide glycol with a molecular weight of about 2000.

The amount of polyether glycol may vary within wide limits. In general, optimum results are obtained using a weight percentage between 41 and 50.

Depending on the meaning of Q, X, m, and n, the amount of araliphatic diol varies between 0,5 and 10 wt. %, but preferably between 1 and 8 wt. %.

Very good results were obtained using an araliphatic diol according to the formula above wherein k=1, Y represents an isopropylidene group, Q and X have the meaning of an H-atom, and m and n=1.

Very good results were also obtained using an araliphatic diol according to the formula above wherein k=1, Y represents an isopropylidene group, Q has the meaning of a $CH_3$ group and X has the meaning of a hydrogen atom, and m and n=1.

The amount of polyisocyanate, calculated as 4,4'-diphenyl methane diisocyanate, is at least 30 and at most 45 wt. %.

Examples of suitable polyisocyanates are 4,4'-diisocyanatodiphenyl, 3,3'-dichloro-4, 4'-diisocyanatodiphenyl, 3,3'-diphenyl-4,4'-diisocyanatodiphenyl, 3,3'-dimethoxy-4, 4'-diisocyanatodiphenyl, 4,4'-diisocyanatodiphenyl methane, 3,3'-dimethyl-4, 4'-diisocyanatodiphenyl methane, and a diisocyanatonaphthalene. Optimum results were obtained using an amount in the range of 35 to 42 wt. %, calculated as 4,4'-diphenyl methane diisocyanate.

The amount of low-molecular weight chain extender in the polyurethane resin is 5 to 20 wt. %, calculated as 1,4-butane diol, less the amount of araliphatic diol according to the formula above. The low-molecular weight chain extending agent preferably has two reactive hydrogen atoms and a molecular weight of at most 500, preferably of at most 300.

Suitable hydroxy-functional compounds include aliphatic or cycloaliphatic polyols having 2 hydroxyl groups. Examples of polyols include ethylene glycol, propylene glycol, diethylene glycol, tetramethylene diol, neopentyl glycol, hexamethylene diol, cyclohexane diol, and bis-(4-hydroxycyclohexyl)methane. Also suitable for use are low-molecular weight amino acid hydrazides such as aminoacetic acid hydrazide, $\alpha$-aminopropionic acid hydrazide, $\beta$-aminopropionic acid hydrazide, $\beta$-amino-$\alpha,\alpha$-dimethyl amino-propionic acid hydrazide, low-molecular weight diamines such as ethylene diamine, 1,2-propylene diamine, 1,4-butylene diamine, 2,3-butylene diamine, hexamethylene diamine, piperazine, 1,4-diaminopiperazine, toluene diamine, phenylene diamine, diphenyl methane diamine, low-molecular weight hydrazines such as hydrazine and monoalkyl hydrazine, low-molecular weight dihydrazides, such as adipic acid dihydrazide and terephthalic acid dihydrazide.

The preparation of thermoplastic polyurethanes for use in the manufacture of the waterproof and water vapour permeable films according to the invention may take the following form.

First, the diisocyanate is charged to a reactor and heated under anhydrous conditions in a nitrogen atmosphere to a temperature between 40 and 100° C., preferably to just above its melting point. The polyether glycol, which preferably is at the same temperature as the diisocyanate, is then added dropwise at such a rate that the glycol is blocked completely by isocyanate groups. During the reaction there is heating to such a temperature as will still allow good stirring of the reaction mixture. This temperature generally is in the range of 60 to 150° C. The mixture of araliphatic diol and low-molecular weight chain extender is then added with good stirring, the resulting mixture is poured into a container and, after cooling, cut up and shaped into a granulate, which is then charged to a twin-screw (mixing) extruder in order to be processed into granules from which films having a thickness up to the range of 10 to 50 µm can be made in a manner known in the art using a flat die extruder or a blow moulding extruder. Alternatively, the polyurethane can be prepared by bringing all of the reaction components into contact with each other virtually simultaneously. In that case preferably first a mixture of polyalkylene ether glycol and chain extenders is made, which is then added to the polyisocyanate. The reaction may take place in a reactor, but also in an extruder. Furthermore, it is possible to carry out the process batchwise or wholly continuously.

Under certain conditions it may be advantageous to carry out the preparation of the prepolymer in the presence of one or more polar organic solvents such as dimethyl formamide, dimethyl acetamide, diethyl formamide, dimethyl sulfoxide, hexamethyl phosphorus amide, tetramethylene urea, and N-methyl-2-pyrrolidone. After evaporation of the solvent and, optionally, further curing of the polymer to the air a film is obtained with a water vapour permeability which is dependent on the composition of the polymer as well the thickness of the film. For every selected film thickness the water vapour permeability should always be at least 1000 $g/m^2$ day. In general, very favourable results are obtained using a polymer film with a thickness in the range of 5 to 35 µm. Optimum results are obtained using a polymer film of 5 to 20 µm thick.

The preparation on a commercial scale of thermoplastic polyurethanes for use in the manufacture of the films according to the invention generally is as follows. The polyol, the chain extender, and the polyisocyanate are fed from separate (stirred) tanks to a mixing device equipped with a stirrer and conveyed from there to a twin-screw (mixing) extruder, with care being taken to ensure that the overall residence time of the mixture in the mixing device and the twin-screw (mixing) extruder does not exceed 2 to 3 minutes. Next to the extuder there is a granulator which cuts the polymer melt up into processable granules with simultaneous cooling.

If so desired, a catalyst may be used in the preparation of the polyurethane, e.g., a tin based catalyst. The amount of it to be incorporated generally ranges from 20 to 2000 ppm, calculated on the total of the constituents taking part in the reaction. The temperature at which the aforesaid addition reactions take place preferably is kept as low as possible in order to prevent the occurrence of objectionable side reactions, which are attended with the formation of allophanate, biuret, and triisocyanate groups. These side reactions cause branching and/or cross-linking of the polymer, resulting in a deterioration of the physical properties in general.

During the polyurethane preparation additives, such as pigments, fillers, stabilisers, antioxidants, dyes, and flame extinguishers, may be added to the reaction mixture at any moment of the preparation.

The manufacture of films from the present polyether urethanes proceeds in a manner known as such from the art, such as described in Kirk-Othmer, *Encyclopedia of Chemical Technology* 9 (1966), pp. 232–241.

Blow moulding extrusion will give films having a thickness in the range of 5 to 35 µm.

However, preference is given to flat films obtained by flat die extrusion on a cooled roller. In that case a roller temperature of between 75 and 185° C., such as is described in U.S. patent specification U.S. Pat. No. 3,968,183, is preferred. In order to counter the film's sticking to the roller, generally a "non-blocking" agent is added, such as microtalc and/or silica, e.g. diatomaceous earth.

If the manufacture of laminates is the main priority, extrusion coating, in which the laminate and the film are produced simultaneously, is also an option.

In order to prevent the resulting films from sticking in the end, the obtained flat film is wound together with LDHD polyethylene film.

For the manufacture of waterproof rainwear or tents according to the present invention very favourable results are obtained using polyurethane films made by flat die extrusion and/or blow moulding extrusion which have a waterproofness of at most 400 $Ml/M^2$ 24 hours.

It was found that the polyurethane films according to the invention are also highly suitable for use in the manufacture of seats, more particularly car seats. Films made from a polyurethane incorporating a halogenated araliphatic diol such as polyoxypropylene(2.4) 2,2-bis(4-hydroxy-3,5- dibromophenyl)propane or polyoxyethylene(2.2) 2,2-bis(2, 3,5,6-tetrabromo-4-hydroxyphenyl)propane have fire retardant properties and so are pre-eminently suitable for the manufacture of aircraft seat covers.

Another important application is the manufacture of waterproof shoes, more particularly sports shoes.

A further use made feasible by the films according to the present invention is the manufacture of mattress covers. The well-known mattress covers made of water vapour permeable films based on copolyether esters admittedly have a high water vapour permeability, but they are not suitable for recurrent use and hence too expensive for use in hotels, hospitals, and the like on account of the too low resistance of copolyether ester films to hydrolytic degradation on repeated sterilisation. Nor are the well-known films based on copolyether ester amides suitable for use to this end, not only because of the presence of a readily hydrolysable ester group, but also because of the fact that the commercially available films made of these polymers have a too low melting point.

The invention will now be elucidated with reference to the following examples. These are for illustrative purposes only and are not to be construed as limiting the scope of the invention in any way. All parts and percentages mentioned in the application are parts by weight and weight percentages, unless otherwise specified.

The following methods were used to determine the properties of the polyurethane films and/or the waterproof garments, shoes, tents, mattress covers, and the like made therewith.

A. Determination of the water vapour permeability (WVP) in accordance with ASTM E96-66 (Procedure B), with the proviso that the water temperature is kept at 30° C., while the ambient temperature is 21° C. at 60% RH.

B. Determination of the waterproofness (WT) by measuring the amount of water in ml/m²24 hours which passes through a film covered on either side with water at a differential pressure of 80 kPa.

C. Determination of the permanent plastic deformation (PPD) using the method specified below.

A 25 mm wide membrane is fixed in a draw bench with a length between grips of 50 mm. The strip is elongated 100% at a rate of 100% per minute, which for the aforementioned length between grips corresponds to 50 mm/min. After elongation, the clamp reverts to its starting position. Next, after a 5-minute wait, a second cycle is started. The permanent plastic deformation, which is expressed as the percentage permanently elongated, can be read from the second curve.

D. Determination of the tear resistance using an Elmendorf tester in accordance with ASTM D1922.

E. Determination of the stress-strain properties in accordance with ISO 1184:
   a) the breaking stress (BS) in MPa, both in the longitudinal direction (LD) and the transverse direction (TD),
   b) the elongation at break (EAB) in %, in the longitudinal direction LD as well as the transverse direction TD.

F. Determination of the softening point $T_1$ in accordance with the following method:
A flat piece of thermoplastic polyurethane film is placed between two quartz discs (diameter=5,8 mm) and introduced into the Mettler Thermo Mechanical Analyzer TMA40. A quartz tubular probe connected to the LVDT position sensitive detector is then positioned on top of the upper disc with a controlled constant load of 2N. After equilibration, the temperature is increased from 30° C. to 250° C. at a rate of 10° C./min. During the temperature scan the probe position versus the sample temperature is recorded. The onset of the change in probe position line is indicated as the softening temperature.

The measurement is carried out in a helium atmosphere. Temperature and height calibration occurs as specified in the Mettler manual.

EXAMPLE 1

Into a reactor of 1500 l were charged 40,7 kg of 4,4'-diphenyl methane diisocyanate (MDI) and, after flushing with nitrogen, heated to about 80° C. Next, 44,8 kg of polyethylene oxide glycol having an average molecular weight of 2000 (PEG2000), which had also been heated to 80° C., were added slowly. Once all the PEG2000 had been added, 0,5 kg of Irganox 1010® and 1 kg of Tinuvin 765® (both ex Novartis) were incorporated into the reaction mixture, after which a mixture of 12 kg of 1,4-butane diol and 2,47 kg of propoxylated bisphenol A in the form of Dianol 320® (ex Akzo Nobel) was added rapidly and with good stirring. The resulting mixture was then immediately poured into a shallow mould and after 24 hours of curing cut and ground up into a granulate in a known manner and then processed into granules with the aid of a twin-screw (mixing) extruder. The softening point Tf of the thus obtained polymer A was determined by means of TMA to be 186° C.

Using an extruder equipped with a flat die this polymer was processed into a 18 μm thick film.

EXAMPLE II (COMPARATIVE EXAMPLE)

In a manner analogous to that disclosed in Example I a polyurethane B was prepared, with the proviso that the Dianol 320® had been replaced in full by 1,4-butane diol.

The softening point of this polymer was 145° C.

This polymer was also made into a film having a thickness of about 20 μm. The outcome of the measurements on the polyurethane films of Example I and the comparative example is listed in Table 1.

TABLE 1

| Property | Polyurethane B | Polyurethane A (inv.) |
|---|---|---|
| thickness in μm | 18.6 | 17.9 |
| WVP in g/m² · 24 hr | 2540 | 2555 |
| WT in ml/m² · 24 hr | 640 | 335 |
| PPD % (permanent plastic deformation) | | |
| LD | 4.1 | 5.9 |
| TD | 3.9 | 5.9 |
| tear resistance in N (calculated on film of 15 μm) | | |
| LD | 0.49 | 0.62 |
| TD | 0.48 | 0.70 |
| breaking stress in MPa | | |
| LD | 35 | 29 |
| TD | 36 | 31 |
| elongation at break in % | | |
| LD | 569 | 467 |
| TD | 603 | 518 |
| softening point $T_f$, ° C. | 145 | 186 |

The results listed in Table 1 clearly show that the waterproofness of the polyurethane film according to the invention is substantially superior to that of the polyurethane film without araliphatic diol. At the same time, other physical properties such as the softening point and the tear resistance in both the longitudinal and the transverse direction have also improved. Furthermore, the films according to the invention exhibit far less adhesion on contact (sticking) than the known polyurethane films.

EXAMPLE III

In a manner analogous to that disclosed in Example I a number of polyurethanes having the following composition were prepared:

TABLE 2

| Polymer | PEG 2000 wt. % | MDI wt. % | butane diol-1,4 wt. % | Dianol 320 ® wt. % | Dianol 220 ® wt. % | Tf TMA °C. | adhesion on contact |
|---|---|---|---|---|---|---|---|
| C | 44 | 41 | 11 | 4 |   | 181 | ++ |
| D | 42 | 41 | 10 | 7 |   | 196 | ++ |
| E | 49 | 36 | 11 |   | 4 | 178 | ++ |

The results listed in Table 2 clearly show the higher softening point and the greatly reduced adhesion on contact (sticking) of the polyurethane films according to the invention.

What is claimed is:

1. Non-porous, waterproof film having a water vapor permeability of at least 1000 g/m² day in accordance with ASTM E96-66 (Procedure B), with the proviso that the water temperature is kept at 30° C., while the ambient temperature is 21° C. at 60% RH, comprising a thermoplastic polyurethane composed of a polyether glycol, a polyisocyanate, and a chain extender, at a ratio of NCO to active hydrogen atom of 0.9:1 to 1.2:1, wherein the polyurethane is a reaction product of a composition comprising a) 40 to 52 wt. % of a total weight of the composition of polyalkylene oxide glycol having an average molecular weight of 800 to 4000 and an atomic ratio of carbon to oxygen in the range of 2.0:1 to 4.3:1, with the proviso that at least 30 wt. % of the polyurethane is composed of a polyether glycol having an atomic ratio of carbon to oxygen in the range of 2.0:1 to 2.4:1, b) 30 to 45 wt. % of the total weight of the composition of 4,4'-diphenyl methane diisocyanate, and c) 5 to 20 wt. % of the total weight of the composition of a combined amount of 1,4-butane diol and an araliphatic diol, both the 1,4-butane diol and the araliphatic diol being present in the composition, with the araliphatic diol comprising 0.5 to 10 wt. % of the total weight of the composition and having the formula

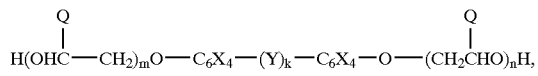

wherein k=0 or 1, where if k=1, Y stands for a methylene or isopropylidene group, Q has the meaning of an H-atom or a $CH_3$-group, $C_6X_4$ has the meaning of a phenylene group wherein X is hydrogen or a chlorine or bromine atom, and m and n is the same or different and stand for an integer≧1, with m+n≦10, wherein a) is not c).

2. A non-porous polyurethane film according to claim 1, wherein the molecular weight of the polyalkylene oxide glycol is in the range of 1000 to 3000.

3. A non-porous polyurethane film according to claim 1, wherein the weight percentage of polyalkylene oxide glycol is in the range of 41 to 50.

4. A non-porous polyurethane film according to claim 1, wherein the weight percentage of 4,4'-diphenyl methane diisocyanate is in the range of 35 to 42 wt. %.

5. A non-porous polyurethane film according to claim 1, wherein the polyalkylene oxide glycol has an average molecular weight of about 2000.

6. A non-porous polyurethane film according to claim 1, wherein in the araliphatic diol, k=1 and Y represents an isopropylidene group, while Q and X have the meaning of an H-atom and m and n=1.

7. A non-porous polyurethane film according to claim 1, wherein in the araliphatic diol, k=1 and Y represents an isopropylidene group, while Q has the meaning of a $CH_3$-group and X has the meaning of an H-atom and m and n=1.

8. A non-porous polyurethane film according to claim 6, wherein the araliphatic diol is present in an amount of 1 to 8 wt. %.

9. Rainwear comprising the non-porous waterproof film according to claim 1.

10. A tent comprising the non-porous waterproof film according to claim 1.

11. A seat comprising the non-porous waterproof film according to claim 1.

12. A mattress cover comprising the non-porous waterproof film according to claim 1.

13. A shoe comprising the non-porous waterproof film according to claim 1.

14. Underslating for roofing structures comprising the non-porous waterproof film according to claim 1.

15. A medical garment comprising the non-porous waterproof film according to claim 1.

16. A wound dressing comprising the non-porous waterproof film according to claim 1.

* * * * *